April 4, 1944.    F. A. TALBOT    2,345,889

SIGHT GLASS

Filed Jan. 5, 1944

Light reflecting coating and indicating lines.

F. A. Talbot.
INVENTOR.
BY Barry & Cyr
Attorneys

Patented Apr. 4, 1944

2,345,889

UNITED STATES PATENT OFFICE 2,345,889

SIGHT GLASS

Frank A. Talbot, Baltimore, Md., assignor of one-half to Robert E. Barry, Washington, D. C.

Application January 5, 1944, Serial No. 517,143

7 Claims. (Cl. 73—331)

This invention relates to improvements in sight glasses and more particularly to a novel sight glass of the bull's-eye type.

An object of the present invention is to provide a sight glass of simple, inexpensive design and especially adapted for use with the wall of a receptacle containing a liquid which should be kept at a substantially uniform level.

Another object is to furnish a sight glass designed to magnify the meniscus and render it plainly visible from various angles forwardly of the glass.

Still another object is to supply a sight glass that may be readily manufactured, mainly, from a rod of Lucite or other suitable transparent plastic material.

With the foregoing objects outlined and with other objects in view which will appear as the description proceeds, the invention consists in the novel features hereinafter described in detail, in connection with the accompanying drawing, in which.

Figure 1:
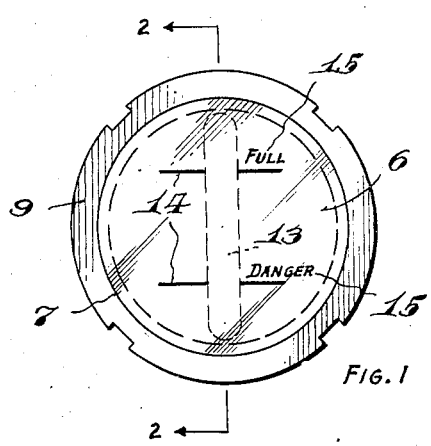
Fig. 1 is a front elevation of one form of the sight glass.
Figure 2:
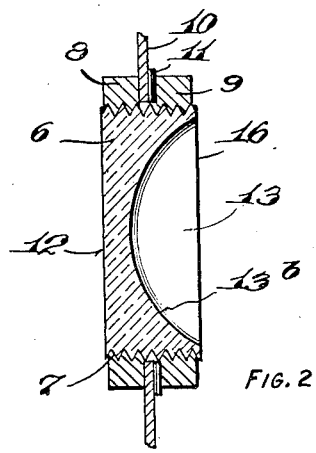
Fig. 2 is a diametrical sectional view taken on the line 2—2 of Fig. 1.
Figure 3:
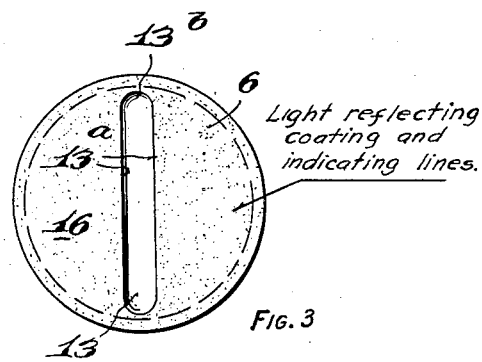
Fig. 3 is a rear elevation of the body of the sight glass.
Figure 4:
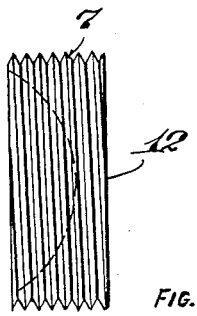
Fig. 4 is a side elevation of the same.

Referring to Figs. 1 to 4, inclusive, 6 designates a substantially cylindrical body of transparent material having peripheral screw threads 7 for threaded engagement with an outer collar 8 and an inner collar 9 used in clamping the body in leak-proof manner to the apertured wall 10 of a receptacle (not shown) containing the liquid to be gauged. A sealing gasket 11 is interposed between the ring 9 and the wall of the receptacle.

The front of the body has a polished surface 12, and a diametrical arcuate groove or slot 13 extends into the body from the rear thereof. The sides 13a of the groove are substantially parallel and the bottom of the groove is preferably arc-shaped transversely of the groove throughout the length thereof, as indicated at 13b, for magnifying purposes. The rear surface of the body is preferably roughened at opposite sides of the groove to facilitate application of calibration marks 14 and indicia 15, and after such application, the rear surface is provided with a light reflecting layer 16, which may be a coating of white or light colored water-proof paint.

Figure 5:
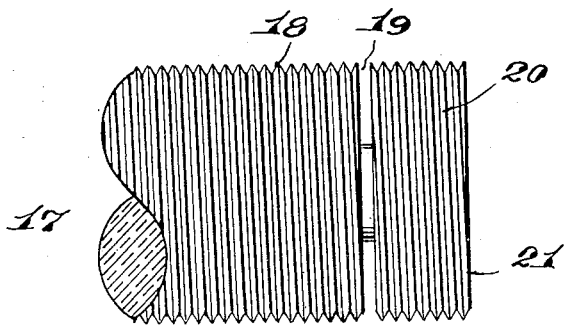
Fig. 5 is a side elevation of a cylindrical rod of Lucite or the like and partially illustrating the method of manufacturing sight glass bodies.

If the body is of Lucite or a similar plastic, it may be manufactured as follows: A cylindrical rod 17 (Fig. 5) of such plastic may first be provided with peripheral screw threads 18 before being sliced, as indicated at 19, into disks 20. Before or after the disk is completely severed from the rod, its face 21 is polished, prior to cutting the groove 13 therein from the opposite face thereof, by a rotary cutter or the like. Subsequently the calibrations, indicia and reflecting coating are applied.

It is obvious that the body may also be made of a piece of molded glass or the like.

While I have disclosed my novel sight glass it is manifest that changes may be made in the details disclosed without departing from the spirit of the invention, as expressed in the following claims.

What I claim and desire to secure by Letters Patent is:

1. A sight glass of the bull's-eye type comprising a substantially cylindrical transparent disk having a substantially diametrical groove of materially greater length than width, extending into the disk from one face thereof, the groove being of arc-shape from end to end, and an opaque surface backing said face of the disk and arranged alongside of said groove.

2. A sight glass of the bull's-eye type comprising a substantially cylindrical transparent disk having a substantially diametrical groove extending into the disk from one face thereof, the groove being of arc-shape from end to end, and an opaque surface backing said face of the disk and arranged alongside of said groove, the periphery of the disk being provided with screw threads.

3. A sight glass of the bull's-eye type comprising a substantially cylindrical transparent disk having a substantially diametrical groove of materially greater length than width, extending into the disk from one face thereof, the groove being of arc-shape from end to end, and also having a bottom of arc-shape transversely of the groove, and an opaque surface backing said face of the disk and arranged alongside of said groove.

4. A sight glass of the bull's-eye type comprising a substantially cylindrical transparent disk having a substantially diametrical groove extending into the disk from one face thereof into close proximity to the opposite face thereof, the groove being of arc-shape from end to end and of materially greater length than width, and an opaque surface backing the first mentioned face of the disk and arranged alongside of said groove.

5. A sight glass of the bull's-eye type comprising a substantially cylindrical transparent disk provided with substantially parallel faces and a threaded periphery, said disk having a diametrical groove extending into the disk from one face thereof into close proximity to the opposite face thereof and having a length substantially equal to the diameter of the disk, the groove being substantially arc-shaped from end to end and having approximately parallel opposite walls, and an opaque light reflecting surface backing the grooved side of the disk.

6. A sight glass of the bull's-eye type comprising a substantially cylindrical transparent disk provided with substantially parallel faces, said disk having a diametrical groove extending into the disk from one face thereof into close proximity to the opposite face thereof and having a length substantially equal to the diameter of the disk, the groove being substantially arc-shaped from end to end and having approximately parallel opposite walls, and an opaque light reflecting surface backing the grooved side of the disk.

7. A sight glass of the bull's-eye type comprising a substantially cylindrical transparent disk having a substantially diametrical groove of materially greater length than width extending into the disk from one face thereof, an opaque light reflecting surface backing said face of said disk and arranged at both sides of said groove, the opposite face of the disk being unobstructed to facilitate viewing of liquid in the groove from various angles.

FRANK A. TALBOT.